Patented Jan. 30, 1945

UNITED STATES PATENT OFFICE 2,368,545

SULPHUR DIOXIDE RECOVERY METHOD

George W. Hooker, Lewis R. Drake, and Stephen C. Stowe, Midland, Mich., assignors to The Dow Chemical Company, Midland, Mich., a corporation of Michigan No Drawing. Application August 18, 1939, Serial No. 290,864

11 Claims. (Cl. 23—178)

This invention concerns certain new agents and an improved method for the recovery of sulphur dioxide from gases and liquids containing the same. It particularly concerns the extraction of sulphur dioxide from its mixtures with other gases or with low boiling hydrocarbons or halohydrocarbons.

Many industrial processes either make or involve the use of mixtures of sulphur dioxide with other gases or low boiling hydrocarbons or halohydrocarbons and often it is desirable to separate and recover the sulphur dioxide from such mixtures. The instances in which this problem is encountered are too numerous for discussion, but illustrative mixtures of the type just mentioned are the mixtures of sulphur dioxide with nitrogen and oxygen produced during the manufacture of sulphur dioxide by the oxidation of sulphur with air; the mixtures of sulphur dioxide with hydrocarbons such as methane, ethane, butylene, butadiene, isoprene, acetylene, methyl acetylene, ethyl acetylene, etc., which are sometimes obtained during treatments of petroleum fractions or cracked petroleum fractions with sulphur dioxide; mixtures of sulphur dioxide with low boiling chlorinated hydrocarbons such as vinyl chloride, chloro-propylene, etc., which have in some instances been obtained in processes for producing useful chemicals from petroleum, etc.

When the substances mixed with the sulphur dioxide are relatively high boiling compounds, the sulphur dioxide can usually be separated by distillation or evaporation from the other ingredients. However, there are numerous instances where the ingredients other than sulphur dioxide either distill or react with the sulphur dioxide under usual distilling conditions or where distillation is not practicable due to corrosion problems involved. For instance, the distillation of sulphur dioxide from its mixtures with nitrogen, air, or the normally gaseous hydrocarbons is inconvenient since it must be carried out under pressure. Also, certain hydrocarbons, particularly the butylenes and butanes, form azeotropic mixtures with sulphur dioxide, thereby rendering complete separation difficult, if not impossible, while others, such as butadiene, have a pronounced tendency to react chemically with the sulphur dioxide, again rendering difficult the direct separation by distillation. Also, when any such mixture includes moisture, distillation may be undesirable because of the corrosive action of the moist sulphur dioxide toward metal equipment.

In those instances where separation of the sulphur dioxide by distillation or evaporation is undesirable or impractical, the separation is usually effected by scrubbing sulphur dioxide from the mixtures with water. This treatment is often disadvantageous since it involves the formation of a corrosive acid solution, frequently necessitates extra steps for drying organic components of the mixtures after completion of the scrubbing operation, and, when the sulphur dioxide is to be recovered, necessitates extra steps for separating the same from its dilute aqueous solutions.

We have found that organic sulphones, when liquefied, are excellent solvents for sulphur dioxide and may be used to absorb or extract sulphur dioxide from gases and vapors containing the same. Most organic sulfones, when liquefied, will absorb a far greater proportion of sulphur dioxide than is absorbed by the same weight of water under otherwise similar test conditions. Furthermore, anhydrous solutions of sulphur dioxide in the liquefied sulphones are substantially non-corrosive toward iron, steel and other usual structural metals, hence the absorption or extraction may be carried out in usual metal equipment. The presence of moisture will, of course, render the extract corrosive and the extraction of sulphur dioxide from moist mixtures comprising the same is preferably carried out in corrosion-resistant apparatus. Sulphur dioxide may be recovered from the sulphone solution by warming the latter at temperatures below that at which the sulphone decomposes. The sulphur dioxide thus vaporized and recovered from the solution is usually substantially pure.

Any of a wide variety of organic sulphones, e. g., diethyl sulphone, diisopropyl sulphone, dibutyl sulphone, di-secondary butyl sulphone, di-phenyl sulphone, sulphonal, the sulphones of butadiene-1.3, isoprene, 2-ethyl-butadiene-1.3, 2.3-dimethyl-butadiene-1.3, 1.4-dithian, etc., may be liquefied and employed in the process for the absorption and recovery of sulphur dioxide from gases and vapors containing it. For convenience the sulphones of conjugated diolefines are hereinafter referred to as the "diolefine sulphones," e. g., as "butadiene sulphone," "isoprene sulphone," etc. The only restrictions on the sulphones which may be used are that they should contain no groups or radicals which react with the sulphur dioxide to form compounds which are as stable toward heat as the sulphone alone and they should be sufficiently stable toward heat to withstand, without undergoing appreciable decomposition, evaporation of sulphur dioxide from its solutions therewith.

However, the cyclic sulphones such as those obtained by the reaction of conjugated diolefines with sulphur dioxide are, because of their properties and their ease of preparation from inexpensive starting materials, particularly well adapted to use in the process. These sulphones, when liquefied, have exceptionally great absorptive capacities for sulphur dioxide, but are very poor solvents or non-solvents for the lower aliphatic hydrocarbons and lower chloro-aliphatic hydro carbons. Accordingly, they are well suited to use as agents for scrubbing sulphur dioxide from its vapor mixtures with such aliphatic compounds to purify the latter and at the same time recover the sulphur dioxide. The latter may be evaporated and thus recovered from the extract, leaving the liquefied cyclic sulphone in condition for re-employment.

As hereinbefore stated, the sulphones must be liquefied for use in the process, since the solid crystalline sulphones have little if any absorptive capacity for sulphur dioxide. The sulphones may be liquefied by melting or by addition of a solvent, preferably in amount sufficient to cause liquefaction at room temperature or thereabout. The latter mode of liquefaction is preferred since it permits use of the sulphones as sulphur dioxide absorbents over a wider range of temperatures than would otherwise be possible. A wide variety of solvents may be used to liquefy the sulphones, the best solvent in any given instance being dependent upon the particular sulphone used. Among the solvents which may be used for this purpose are acetone, ethyl acetate, benzene, ortho-dichlorobenzene, methyl-ethyl ketone, etc. Water may also sometimes be used, but due to the corrosiveness of aqueous sulphur dioxide solutions, its use frequently is disadvantageous.

In practice, liquefaction is preferably accomplished by admixing two or more sulphones, whereby the melting point of each is depressed, and using the mixture at somewhat above its liquefying temperature as an absorbent for sulphur dioxide. This mode of liquefaction is advantageous in that it avoids dilution of the sulphones and results in a liquefied mixture having, at its liquefying temperature and somewhat above, a great absorptive capacity for sulphur dioxide. The freezing point of such sulphone mixture may be depressed further by dissolving a small proportion of sulphur dioxide therewith. For example, the sulphone of butadiene-1.3 and that of isoprene melt at 65° and 64° C., respectively. However, an equimolecular mixture of these sulphones melts at approximately 28° C. and by dissolving only 8 per cent by weight of sulphur dioxide in the mixture the freezing point, i. e., the temperature at which sulphone crystallizes out, is depressed to between −4° and −8° C. At 28° C., this mixture of sulphones will dissolve approximately 37 per cent of its weight of sulphur dioxide and at 10° C. it dissolves 95 per cent of its weight of sulphur dioxide. In evaporating sulphur dioxide from its solution in any sulphone or mixture of sulphones it is advantageous to leave a small proportion of the sulphur dioxide dissolved so as to depress the freezing point of the sulphone residue and render it re-usable at room temperature or below as an absorbent for additional sulphur dioxide.

The extraction of sulphur dioxide with the liquefied sulphones may be carried out in any of the ways usual with other extractants. For instance, gaseous mixtures containing sulphur dioxide may be bubbled through or treated in a scrubbing tower with the liquefied sulphones to extract the sulphur dioxide therefrom, leaving the other components of the mixture relatively pure. The extract is then heated at a temperature below that at which the sulphone decomposes, usually at a temperature between 70° and 100° C., to evaporate most of the sulphur dioxide and leave the sulphone in condition for re-employment. The vaporized sulphur dioxide is collected in usual manner.

Although the liquefied sulphones are most advantageously used for the recovery of sulphur dioxide from gases, since other convenient methods for recovering sulphur dioxide from liquid solutions are known, the sulphones may be used to extract sulphur dioxide from its solutions in organic liquids, e. g., liquid fractions of petroleum, which do not dissolve the sulphones.

The following examples illustrate certain ways in which the principle of the invention has been applied, but are not to be construed as limiting the invention.

EXAMPLE 1

Solutions of sulphur dioxide and butadiene sulphone in varying proportions were prepared and their melting points determined. The following table gives the per cent by weight of sulphur dioxide in each solution and the melting point of the solution.

Table I

| Per cent $SO_2$ | M. P., °C. |
|---|---|
| 0 | 65 |
| 10 | 55 |
| 20 | 46 |
| 30 | 37 |
| 40 | 27 |
| 50 | 18 |
| 60 | 9 |
| 70 | 0 |

In addition to the above data, it may be mentioned that the solutions of sulphur dioxide and the sulphone are subject to super-cooling and that such solution may remain liquid at temperatures considerably below its melting point. Likewise during vaporization of sulphur dioxide from such solution the latter may remain liquid at room temperature or thereabout until nearly all of the sulphur dioxide has been removed.

EXAMPLE 2

A solution of sulphur dioxide and the sulphone of butadiene-1.3 which was saturated with sulphur dioxide at 0° C. was warmed gradually at atmospheric pressure while in contact with an atmosphere of sulphur dioxide and the concentration of sulphur dioxide in the solution was measured at different temperatures. Table II gives the sulphur dioxide concentration at each temperature in terms of the pounds of sulphur dioxide dissolved per pound of sulphone. Similar data on the solubility of sulphur dioxide in water is presented for purpose of comparison.

Table II

| Temperature, °C. | Lbs. $SO_2$ per lb. sulphone | Lbs. $SO_2$ per lb. $H_2O$ |
|---|---|---|
| 0 | At least 2.4 | 0.23 |
| 5 | 1.23 | 0.19 |
| 10 | 0.85 | 0.16 |
| 15 | 0.61 | 0.14 |
| 20 | 0.48 | 0.11 |
| 30 | 0.30 | 0.08 |
| 40 | 0.19 | 0.05 |
| 50 | 0.14 | |
| 60 | 0.09 | |
| 70 | 0.06 | |
| 80 | 0.04 | |

From the above table it will be seen that liquefied butadiene sulphone is a far better solvent for sulphur dioxide than is water. It will also be noted that more than 4 times as much sulphur dioxide is vaporized on warming 1 pound of a saturated solution of sulphur dioxide and the sulphone from 0° to 40° C. than is obtained upon warming 1 pound of a saturated solution of sulphur dioxide in water from 0° to 40° C. Accordingly, the capacity of a sulphur dioxide recovery unit may be increased greatly by employing the liquefied sulphone, rather than water, as the extractant.

EXAMPLE 3

Mixtures of the crystallizable sulphones of butadiene-1.3 and of isoprene in various proportions were prepared and the melting point of each mixture was determined. Table III gives the melting point of each individual sulphone and also the composition and melting point of each mixture.

Table III

| Test No. | Sulphones | | M. P., °C. |
|---|---|---|---|
| | Kind | Molal, per cent | |
| 1 | Butadiene | 100 | 65 |
| 2 | Isoprene | 100 | 64 |
| 3 | Butadiene<br>Isoprene | 27<br>73 | 48.5 |
| 4 | Butadiene<br>Isoprene | 37<br>63 | 41.2 |
| 5 | Butadiene<br>Isoprene | 51<br>49 | 29 |
| 6 | Butadiene<br>Isoprene | 69<br>31 | 44.5 |
| 7 | Butadiene<br>Isoprene | 77<br>23 | 51.7 |

Table III shows that most mixtures of butadiene sulphone and isoprene sulphone have melting points below those of the individual sulphones. Accordingly, the mixtures are more readily liquefied and are better suited to use in the invention than are the individual sulphones. As hereinbefore pointed out, the dissolving of only a small proportion of sulphur dioxide in any sulphone or mixture of sulphones will depress the melting point below that of the sulphone alone. For instance, by dissolving only 8 per cent by weight of sulphur dioxide in an equimolecular mixture of butadiene sulphone and isoprene sulphone (M. P. about 28° C.), a solution is obtained which remains liquid at temperatures as low as −4° C.

EXAMPLE 4

The solubility of sulphur dioxide in a liquefied equimolecular mixture of butadiene sulphone and isoprene sulphone was determined at a number of different temperatures by procedure similar to that described in Example 2. Table IV gives the concentration of sulphur dioxide at each temperature in terms of the pounds of dissolved sulphur dioxide per pound of the sulphones.

Table IV

| Temperature, °C. | Lbs. SO$_2$ per lb. sulphones |
|---|---|
| 10 | 0.95 |
| 16.6 | 0.61 |
| 22 | 0.47 |
| 25 | 0.415 |
| 30 | 0.346 |
| 35 | 0.290 |
| 40.5 | 0.242 |
| 45 | 0.226 |
| 50 | 0.175 |
| 55 | 0.155 |
| 60 | 0.135 |
| 65 | 0.115 |
| 70 | 0.105 |
| 80 | 0.080 |

One of the important applications of the present invention is in the recovery of sulphur dioxide from the mixture of diolefine, e. g., butadiene or isoprene, etc., and sulphur dioxide which is produced by the thermal decomposition of a diolefine sulphone. According to the invention the gaseous mixture of sulphur dioxide and diolefine produced by such thermal decomposition may be scrubbed, e. g., at room temperature or thereabout, with a liquefied organic sulphone, preferably a liquefied equimolecular mixture of butadiene sulphone and isoprene sulphone, to extract the sulphur dioxide from the gas and leave the diolefine substantially pure. Sulphur dioxide may then be recovered by vaporization from the extract, leaving the extract in condition for re-employment.

In employing the liquefied sulphones for the extraction of sulphur dioxide from gases which also contain oxygen it is sometimes desirable to carry the extraction out in the presence of an anti-oxidant so as to prevent oxidation of the dissolved sulphur dioxide. Any active reducing agent or other anti-oxidant which is soluble in the liquefied sulphones may be used for this purpose.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method wherein sulphur dioxide is extracted from a gas comprising the same, the step of extracting sulphur dioxide from the gas by contacting the latter with a liquid extractant consisting essentially of a mixture of the sulphones of butadiene-1.3 and isoprene.

2. The method which comprises contacting a gaseous mixture of sulphur dioxide and butadiene with a liquid extractant consisting essentially of an approximately equimolecular mixture of butadiene sulphone and isoprene sulphone, whereby sulphur dioxide is extracted from the gaseous mixture leaving the butadiene relatively pure, and thereafter vaporizing sulphur dioxide from the extract to recover the liquid extractant in condition for re-employment.

3. In a method wherein sulphur dioxide is separated by extraction from a mixture comprising the same, the steps of contacting the mixture with a liquefied organic sulphone, whereby the latter extracts sulphur dioxide from said mixture and forms an extract containing not less than about four times as great a proportion by weight of sulphur dioxide as that in the extract obtainable by using water, instead of the liquefied sulphone, as the extractant under otherwise similar conditions, and thereafter recovering sulphur dioxide from the extract.

4. In a method wherein sulphur dioxide is separated by extraction from a mixture comprising the same, the steps of contacting the mixture with a liquefied mixture of organic sulphones, whereby the latter extracts sulphur dioxide from the mixture comprising the same and forms an extract wherein the ratio by weight of sulphur dioxide to the sulphones is not less than about four times as great as the ratio by weight of the sulphur dioxide to water in an extract obtainable by using water as the extractant under otherwise similar conditions, and thereafter recovering sulphur dioxide from the extract obtained in said extraction with the liquefied sulphones.

5. In a method wherein sulphur dioxide is separated by extraction from a gaseous mixture comprising same, the steps of extracting sulphur dioxide from the gaseous mixture by contacting the latter with a liquefied sulphone of a conjugated diolefine, whereby an extract is formed which contains at least four times as great a proportion by weight of sulphur dioxide as is contained in an extract obtainable by using water as the extractant under otherwise similar conditions, and thereafter recovering sulphur dioxide from said extract obtained by the extraction with the liquefied sulphone.

6. In a method wherein sulphur dioxide is extracted from gases comprising the same, the steps of contacting the gases with a liquefied mixture of sulphones of conjugated diolefines, whereby the liquefied sulphones extract sulphur dioxide from the gases and form an extract containing sulphur dioxide in a proportion by weight at least four times as great as that in an extract obtainable by using water as the extractant under otherwise similar conditions, and thereafter recovering sulphur dioxide from said extract obtained by the extraction with the liquefied sulphones.

7. In a method wherein sulphur dioxide is recovered by extraction from a gas comprising the same, the steps of extracting sulphur dioxide from the gas by contacting the latter with a liquefied extractant comprising an organic sulphone to form an extract wherein the ratio by weight of sulphur dioxide to the sulphone is at least four times as great as the ratio by weight of sulphur dioxide to water in the extract obtainable by using water as the extractant under otherwise similar conditions, and thereafter vaporizing sulphur dioxide from the extract to recover the liquid sulphone-containing extractant in condition for re-employment.

8. In a method wherein sulphur dioxide is extracted from mixtures thereof with aliphatic compounds of the class consisting of aliphatic hydrocarbons and chlorinated aliphatic hydrocarbons, the steps of extracting sulphur dioxide from the mixture by contacting the latter with a liquid extractant comprising an organic sulphone in such manner as to form an extract in which the ratio by weight of sulphur dioxide to the sulphone is not less than about four times as great as the ratio of sulphur dioxide to water in the extract obtainable by using water as the extractant under otherwise similar conditions, and thereafter recovering sulphur dioxide from said extract comprising the organic sulphone.

9. In a method wherein sulphur dioxide is extracted from a gaseous mixture thereof with an aliphatic compound of the class consisting of aliphatic hydrocarbons and chlorinated aliphatic hydrocarbons, the steps of extracting sulphur dioxide from the gaseous mixture by contacting the latter with a liquid extractant comprising a sulphone of a conjugated diolefine under conditions such that the ratio by weight of sulphur dioxide to sulphone in the extract is at least four times as great as the ratio of sulphur dioxide to water in an extract obtainable by using water as the extractant under otherwise similar conditions, and thereafter vaporizing sulphur dioxide from said extract comprising the sulphone to recover the liquid extractant in condition for re-employment.

10. In a method wherein sulphur dioxide is extracted from a gas comprising the same, the steps of extracting sulphur dioxide from the gas by contacting the latter with a liquid extractant comprising a sulphone of butadiene in such manner as to form an extract in which the ratio by weight of sulphur dioxide to the sulphone is at least four times as great as the ratio of sulphur dioxide to water in an extract obtainable by using water under otherwise similar conditions as the extractant, and thereafter recovering sulphur dioxide from said extract comprising the sulphone.

11. The method which comprises contacting a gaseous mixture of sulphur dioxide and a conjugated diolefine with a liquid extractant comprising a sulphone of a conjugated diolefine, whereby sulphur dioxide is extracted from the gaseous mixture leaving the diolefine relatively pure, the ratio by weight of sulphur dioxide to the sulphone in the extract thus formed being at least four times as great as the ratio by weight of sulphur dioxide to water in an extract obtainable by using water under otherwise similar conditions as the extractant, and thereafter recovering sulphur dioxide from said extract comprising the sulphone.

GEORGE W. HOOKER.
LEWIS R. DRAKE.
STEPHEN C. STOWE.